(12) United States Patent
Kawamoto

(10) Patent No.: US 6,516,419 B1
(45) Date of Patent: Feb. 4, 2003

(54) NETWORK SYNCHRONIZATION METHOD AND NON-BREAK CLOCK SWITCHING METHOD IN EXTENDED BUS CONNECTION SYSTEM

(75) Inventor: Kazuhiro Kawamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/363,869

(22) Filed: Jul. 29, 1999

(30) Foreign Application Priority Data

Jul. 31, 1998 (JP) .......................................... 10-218073
Aug. 3, 1998 (JP) .......................................... 10-218774

(51) Int. Cl.$^7$ ............................................. G06F 13/42
(52) U.S. Cl. ........................ 713/400; 375/215; 375/347; 375/368; 327/36; 327/149; 370/392; 714/705
(58) Field of Search ................................. 375/368, 347, 375/215; 370/392; 327/149, 36; 714/705

(56) References Cited

U.S. PATENT DOCUMENTS

| 4,881,243 A | * | 11/1989 | Whitt .......................... 375/215 |
| 4,891,599 A | * | 1/1990 | Lauper et al. ................. 327/36 |
| 4,998,242 A | * | 3/1991 | Upp ............................ 370/392 |
| 5,631,931 A | * | 5/1997 | Takano et al. ............... 375/347 |
| 5,896,392 A | * | 4/1999 | Ono et al. ................... 714/705 |
| 5,910,740 A | * | 6/1999 | Underwood ................. 327/149 |

* cited by examiner

Primary Examiner—Jeffrey Gaffin
Assistant Examiner—Mohammad O. Farooq
(74) Attorney, Agent, or Firm—Scully, Scott, Murphy & Presser

(57) ABSTRACT

A method of simple network synchronization in a bus extension system with expanded capabilities wherein a plurality of independently-operable multimedia multiplexing devices are connected to the same network in parallel. The method of network synchronization for multiplexing devices connected by parallel through an extension bus is provided wherein one of two or more multiplexing devices is used as a clock master and other remaining multiplexing devices as slave devices and wherein the multiplexing device acting as the clock master is operated in synchronization with a clock received from a network while the multiplexing devices acting as the slave devices receive a clock from a clock transmission line of the extension bus which is outputted after the clock master has established synchronization with the network clock and regenerate a clock leading the received clock in phase.

7 Claims, 9 Drawing Sheets

NETWORK SYNCHRONIZATION METHOD AND NON-BREAK CLOCK SWITCHING METHOD IN EXTENDED BUS CONNECTION SYSTEM

BACKGROUND OF THE INVENTION

1. Field of the Invention

The present invention relates to a system employing extended bus connection to extend capabilities by connecting, in parallel, a plurality of independently-operable multimedia multiplexing devices connected to the same network and more particularly to a method of network synchronization for a whole extended system.

2. Description of the Related Art

In a conventional system using extended bus connection to extend capabilities by connecting, in parallel, a plurality of independently-operable multimedia multiplexing devices connected to the same network, as shown in FIG. 9, when data is transmitted among devices, each of multiplexing devices is operated in phase synchronization with a network clock and a clock fed by a particular device is used as a clock for transmission among multiplexing devices.

Moreover, in a conventional method for switching a clock, a redundancy configuration is used.

Accordingly, if data transmission is performed by using a clock fed by an arbitrary number N of devices as a clock in an extension bus, N systems of clock transmission lines are required in the extension bus, and elastic memory is necessary to perform data transmission and a migration of a clock among multiplexing devices.

FIG. 9 shows a block diagram showing operations wherein clock signals from N systems are outputted to each of extension buses from a driver circuit 3 of N units of multiplexing devices and one of N systems is selected.

However, as described above, in the system in which each of multiplexing devices is operated in phase synchronization with a network clock, phase synchronization of a clock outputted from each device is well matched, however, because a point of changes in clocks varies depending upon a length of an extension bus cable to be connected or upon positional relation of connected devices, switching of the clock is not easy.

To solve this problem, by providing elastic memory for every clock, switching not the clock but the migrated data is made possible, however, there is still problem in that elastic memory of N systems is required to do this, thus causing large-sized hardware.

SUMMARY OF THE INVENTION

In view of the above, it is an object of the present invention to provide a method of synchronization to allow a whole system to establish synchronization with a network and a method of switching a clock to allow continuous service without instantaneous chopping of data by employing simple and highly-stable hardware configurations.

According to a first aspect of the present invention, there is provided a method of network synchronization for an extended system having a plurality of multiplexing devices connected to the same network in parallel through an extension bus, the method comprising the steps of:

using one of two or more multiplexing devices as a clock master and other remaining multiplexing devices as slave devices wherein the multiplexing device acting as the clock master establishes synchronization with a clock received from the network while the multiplexing devices acting as slave devices establish synchronization with the network by receiving a clock outputted after the clock master has established synchronization with the network, from a clock transmission line of the extension bus, and by regenerating a clock leading the received clock.

In the foregoing, a preferable mode is one that wherein is applied to a system where said multimedia multiplexing device is replaced by a multi-point control device to realize a TV conference among multi-points;

Wherein both a plurality of terminals for TV conference and a plurality of the multi-point control devices independently-operable are connected to the same network in parallel.

According to a second aspect of the present invention, there is provided a method of network synchronization among two or more multiplexing devices constituting an extended system connected to the same network in parallel through an extension bus, the method comprising the steps of:

using one of two or more multiplexing devices as a clock master and other remaining multiplexing devices as slave devices wherein the multiplexing device acting as the clock master establishes synchronization with a clock received from the network, while the multiplexing devices acting as slave devices establish synchronization with other multiplexing devices by receiving a clock outputted after the clock master has established synchronization with the network, from a clock transmission line of the extension bus, and by regenerating a clock leading the received clock in phase.

According to a third aspect of the present invention, there is provided a method of network synchronization for an extended system having a plurality of multiplexing devices connected to the same network in parallel through an extension bus, the method comprising the steps of:

using one of two or more multiplexing devices as a clock master and other remaining multiplexing devices as slave devices wherein the multiplexing device acting as the clock master establishes synchronization with a clock received from the network, while the multiplexing devices acting as slave devices establish synchronization with the network and the multiplexing devices by receiving a clock outputted after the clock master has established synchronization with the network, from a clock transmission line of the extension bus, and by regenerating a clock leading the received clock in phase.

According to a fourth aspect of the present invention, there is a method for switching a clock master in an extended system having a plurality of multiplexing devices connected to the same network in parallel through an extension bus, the method comprising the steps of:

providing the extension bus with clock transmission lines consisting of an active system and a standby system, and with data transmission lines;

establishing synchronization of a clock between all multiplexing devices and the network, and among the multiplexing devices by slave devices' receiving, through the extension bus, a clock with which a clock master is in phase synchronization with a network clock and by regenerating a clock based on the received clock, wherein each of the multiplexing devices comprises a clock regenerating circuit to regenerate a clock leading the received clock in phase based on the clock received from the network if each of said multiplexing device is used as a clock master or based on a clock received from the extension bus if it is used as slave devices, an output circuit to output a clock regenerated when each of said multiplexing device is used as the clock master and timing signal to an active clock transmission line of the extension bus, a control circuit to monitor the slave state of each device and a fault, and a receiving circuit to output a clock fed from either of the clock lines in response to a control signal fed by the control circuit or to output a clock synthesized clocks from two systems obtained by ANDing clocks fed from the active and standby clock transmission lines; and using one of multiplexing devices to which a role of a clock master is transferred to be a new clock master, wherein, if the control circuit detects that a fault has occurred in the clock master, one of the multiplexing devices to which a role of a clock master is transferred is selected by each control circuit of each multiplexing device, and any of the multiplexing devices decided to be a new clock master outputs regenerated clock to the standby clock transmission line, while other slave devices, using their receiving circuit, temporarily make active clocks from both clock transmission lines, synthesize clocks fed by two systems obtained by ANDing clocks from the active and standby clock transmission lines for outputting, regenerate a clock using the logically synthesized clock, and then stop outputting of a clock to the clock transmission line of the clock master having a fault.

BRIEF DESCRIPTION OF THE DRAWING

The above and other objects, advantages and features of the present invention will be more apparent from the following description taken in conjunction with the accompanying drawings, in which.

DETAILED DESCRIPTION OF THE PREFERRED EMBODIMENTS

Best modes of carrying out the present invention will be described in further detail using various embodiments with reference to the accompanying drawings.

Figure 1:
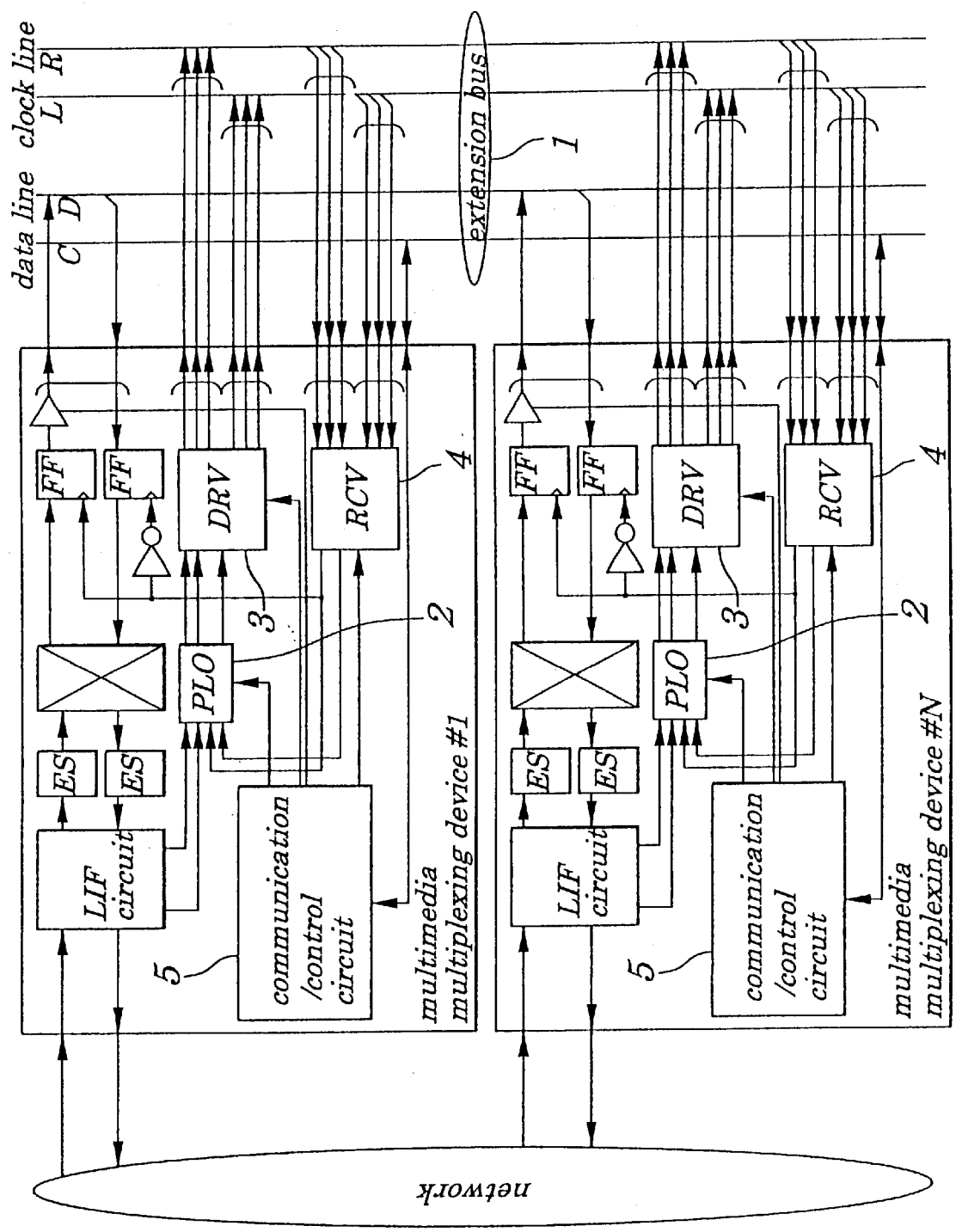
FIG. 1 is a block diagram showing a non-break switching system according to an embodiment of the present invention.

Referring to FIG. 1, a plurality of multimedia multiplexing devices connected to the same network, each operating separately, is connected in parallel through an extension bus comprising two transmission lines including a clock transmission line and a data transmission line, each consisting of a L system as an active one and a R system as a standby one, which acts, as a whole, as a multimedia multiplexing device having the extended number of lines connected to a network.

Each multimedia multiplexing device is provided with a PLO circuit 2 to regenerate a clock as a reference input from the network clock or a clock received from the extension bus, a driver circuit 3 to output the regenerated clock and a timing signal to the clock transmission line of the extension bus, a receiver circuit 4 to AND a clock from the L system clock transmission line of the extension bus with that from the R system clock transmission line of the same to synthesize these two clocks, and a communication/control circuit 5 to monitor, by using communication control functions provided therein, the state of connections among multimedia multiplexing devices and to control each section within the multimedia multiplexing device.

Operations of a non-break clock switching system are described hereafter referring to FIG. 1.

Assuming that a multimedia multiplexing device #1 is connected to a line and is feeding a clock to an extension bus 1, operations of switching the source of the clock of the extension bus 1 from the multimedia multiplexing device #1 to other device are described.

First, the multimedia multiplexing device #1 gathers, using a communication/control circuit 5, information about the states of booting the device and of connecting to a network line via a communication data line C used to perform control among multiplexing devices and to display/transmit information and the like, and if its own device can be operated as a clock master, its own device is set as the clock master and a clock system for the whole system is established.

The multimedia multiplexing device #1 acting as the clock master outputs a clock being in slave synchronization with the network to either of the L or R system clock transmission line of the extension bus 1, while all other multimedia multiplexing devices transmit, by using this clock, data among the devices. In this embodiment, let it be supposed that the L system clock transmission line is to be used.

A multimedia multiplexing device #N set as a device other than a clock master regenerates, using a PLO circuit, a clock as a reference input from a clock fed from the extension bus, thereby operating in phase synchronization with the network.

Operations of the PLO circuit 2, a driver circuit 3 and a receiver circuit 4 are described further in detail.

Figure 2:
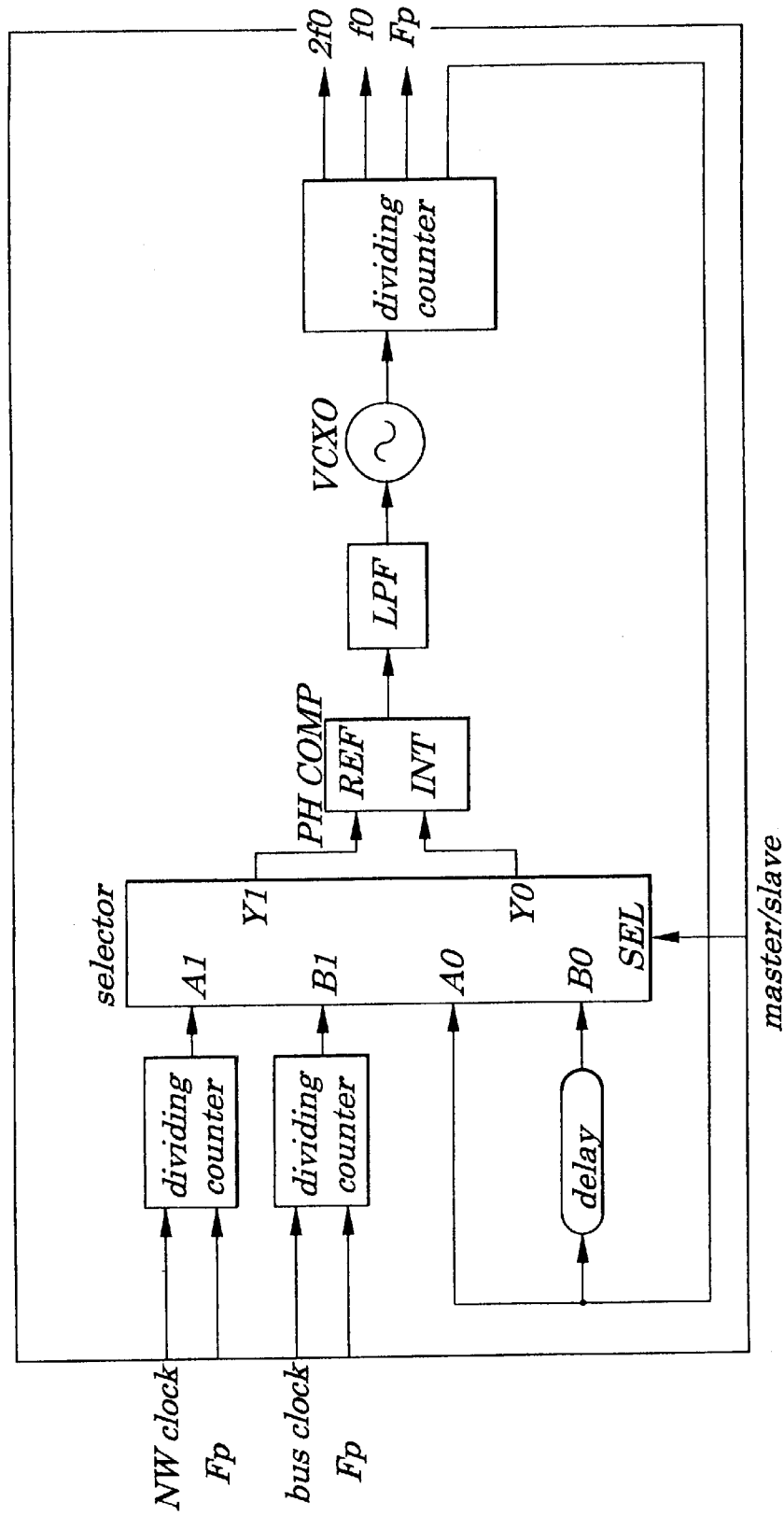
FIG. 2 is a block diagram showing a PLO circuit according to the embodiment of the present invention.

As depicted in FIG. 2, the PLO circuit is composed of a dividing counter to divide a network clock and a clock fed from the extension bus, a selector circuit to switch these clocks as inputs for a phase comparison circuit, the phase comparison circuit, a low path filter, a voltage controlled oscillator, a dividing counter to divide output clocks from the voltage controlled oscillator, and a delay circuit.

The selector circuit located in a stage before the phase comparison circuit is adapted to allow, by using a set signal from the communication/control circuit 5, the multimedia multiplexing device to select either of its operations in phase synchronization with the network clock or with a clock fed from the extension bus and, in the initial state, the operational setting is made so that the multimedia multiplexing device #1 is operated in phase synchronization with the network clock and the multimedia multiplexing device #N operates in phase synchronization with a clock fed from the extension bus.

Moreover, if the multimedia multiplexing device is operated, by the selector circuit, in phase synchronization with the network clock, a clock being in phase with a reference input is regenerated, while, if it is operated in phase synchronization with a clock fed from the extension bus, in order to be synchronized with the clock master, and by taking into consideration a phase delay caused by a connecting cable of the extension bus and by incorporating the delay into a feedback signal obtained by dividing a VCXO output, a clock leading the reference input in phase is regenerated.

The clock regenerated by the PLO circuit 2 and a timing signal are outputted, via the driver circuit 3, to the extension bus.

Figure 3:
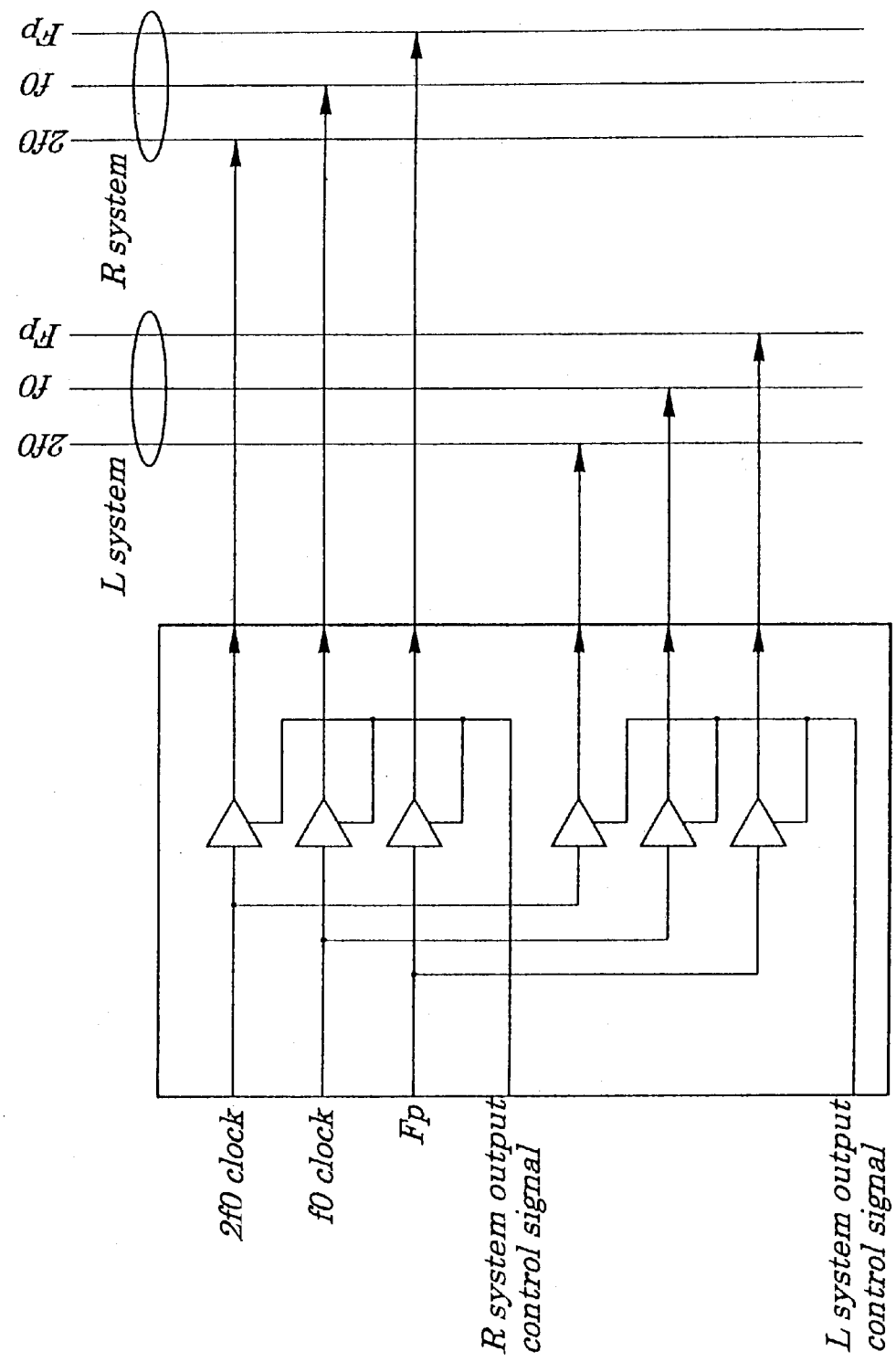
FIG. 3 shows a block diagram of a driver circuit according to the embodiment of the present invention.
Figure 4:
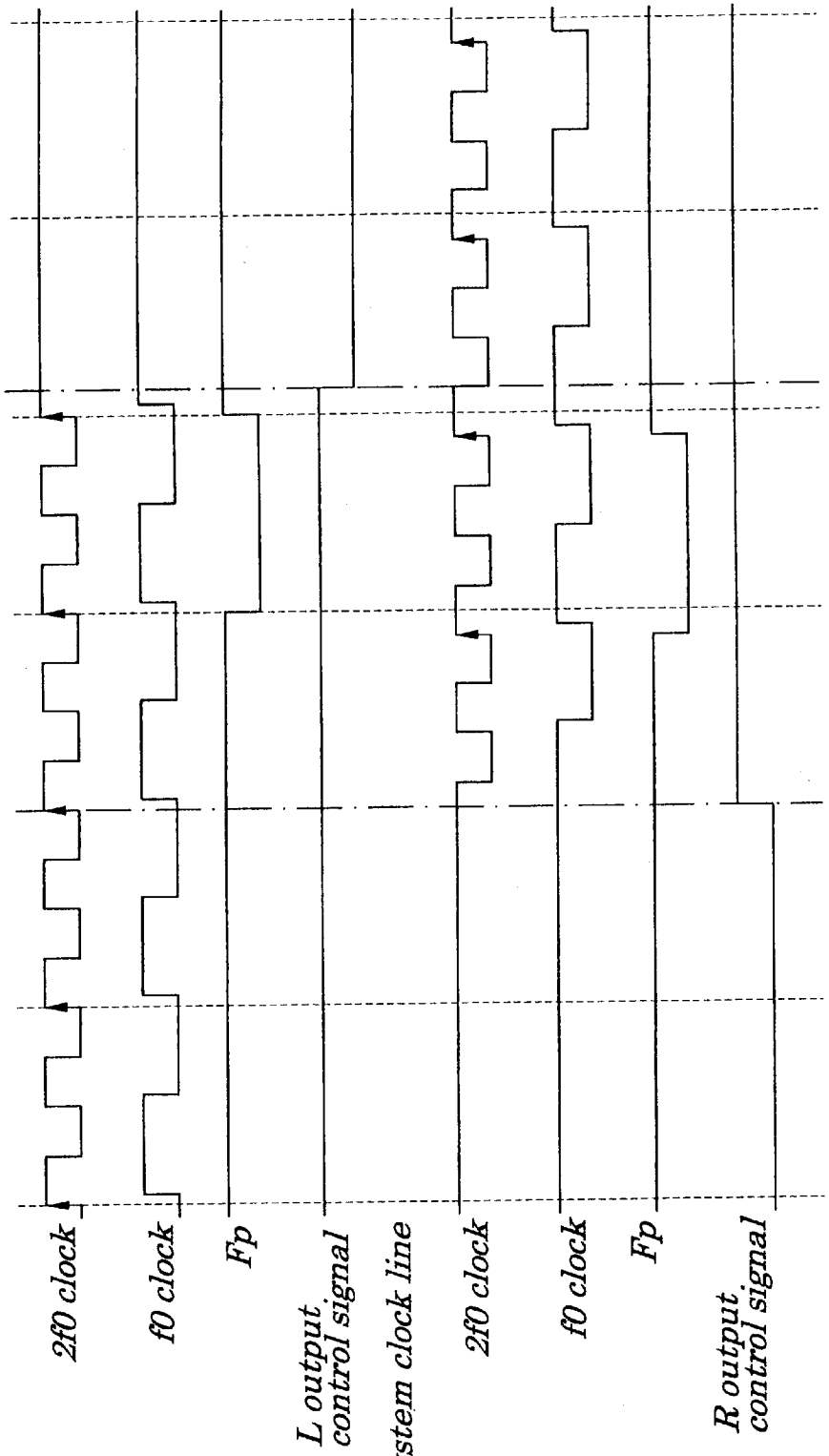
FIG. 4 is a timing chart of the above driver circuit.

FIGS. 3 and 4 are a block diagram of the driver circuit 3 and a timing chart respectively. The driver circuit 3 is adapted to output or to stop outputting of a signal to either of the L or R clock transmission line, by using an output control signal fed by the communication/control circuit 5 and, in the initial state, the operational setting is made so that the multimedia multiplexing device #1 sends out a clock to the L system clock line and the multimedia multiplexing device #N stops sending-out of a clock.

Figure 5:
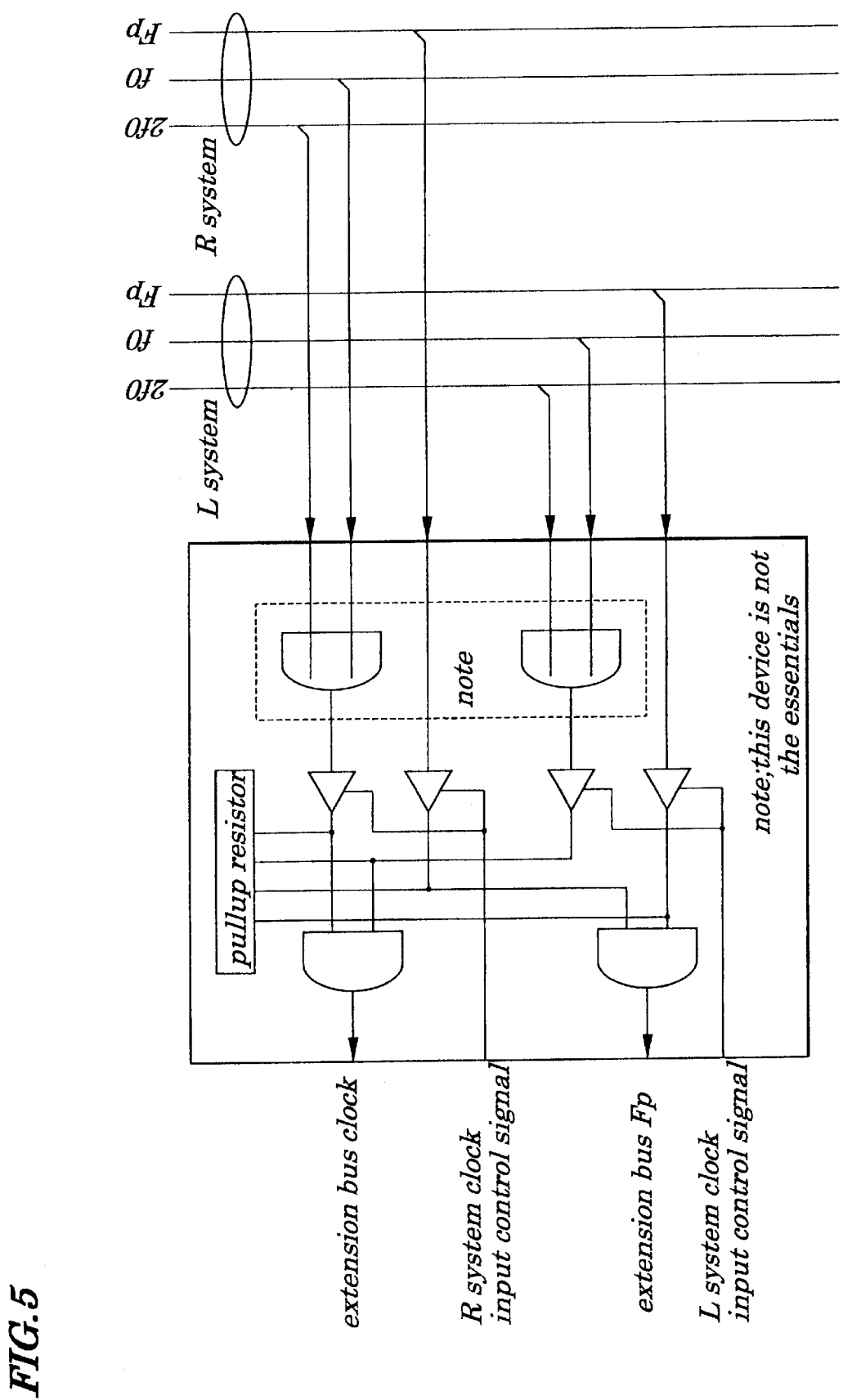
FIG. 5 is a block diagram showing a receiver circuit according to the embodiment of the present invention.
Figure 6:
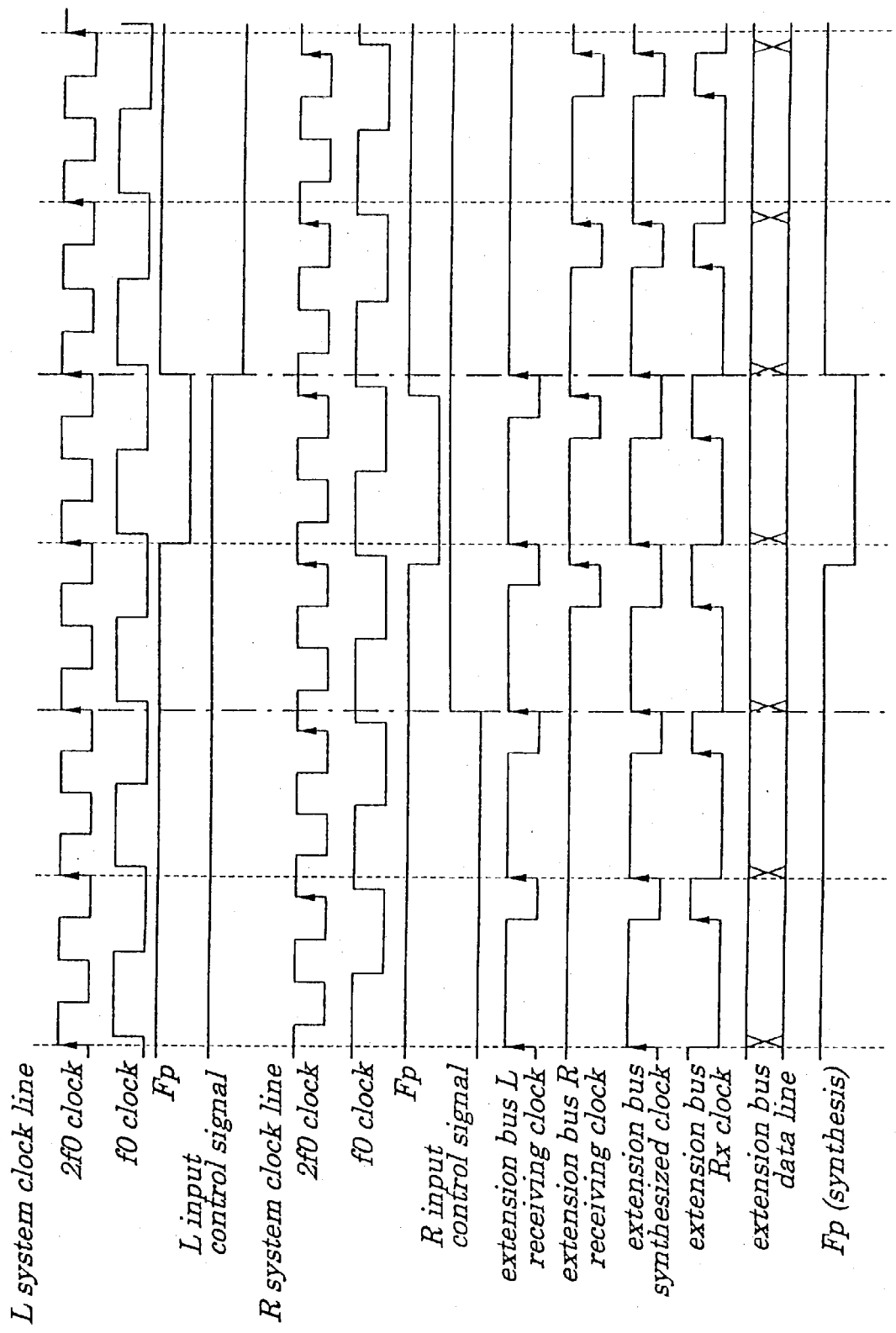
FIG. 6 is a timing chart of the above receiver circuit.

FIGS. 5 and 6 are a block diagram of the receiver circuit 4 and a timing chart respectively.

The receiver circuit 4 is composed of a receiver to receive each of signals fed by the L and R system clock transmission lines, logical circuit to control the input and the stop of inputting of a receiving signal fed by each system by the control of the communication/control section 5, and an AND circuit to AND signals received from 2 systems in which signals from two systems are synthesized to become one signal.

As shown in FIG. 6, either of the L system clock or the R system clock synthesized in such a manner as described above, whichever has an earlier trailing edge and whichever has a later leading edge, is active, and data on the data line is received by the trailing edge of the synthesized clock and data is sent out to the data line by its leading edge, thus enabling the data transmission in an error-free manner.

In all the multimedia multiplexing devices including devices #1 and #N, the operational setting is made so that a clock is inputted to the receiver circuit 4 from the L system clock line and the input from the R system clock line to the receiver circuit 4 is stopped.

Figure 7:
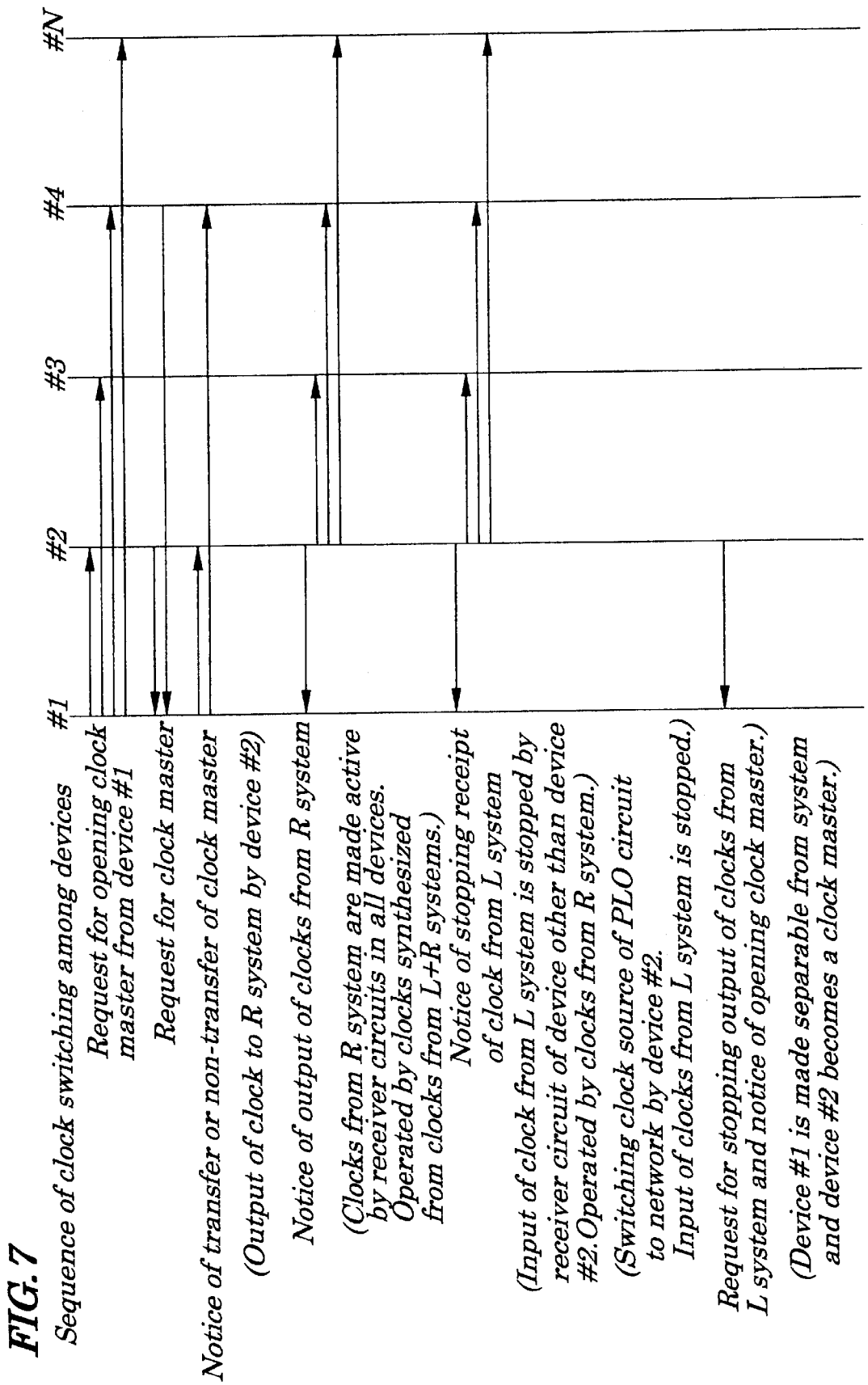
FIG. 7 is a sequence diagram for switching clocks among devices according to the embodiment of the present invention.

Switching operations of a clock performed when the network clock is shut down due to the power-off of the multimedia multiplexing device #1 or the turn-off of a line is described by referring to FIG. 7.

The multimedia multiplexing device #1 being currently acting as a clock master, if events occur that the power switch is pressed or that the network clock is shut down due to the turn-off the line and the like, sends out a request for opening a clock master of other devices from the communication/control circuit 5 via the communication data line C.

Any of the multimedia multiplexing devices #2–#N that have received the above request detects that the device #1 is in an inoperative state as the clock master and, if any one of the devices can be a clock master, it sends out a request that the device #1 should transfer its role being a clock master thereto.

The multimedia multiplexing device #1, by referring to orders of the power-in and the like, decides a candidate to be a clock master next and, if it is here assumed to be the device #2, the device #1 sends out information about transfer of the role of the clock master to the device #2 and also information about no-transfer of the role to other devices other than the device #2.

The multimedia multiplexing device #2 selected as the candidate for a clock master starts sending out a clock being in phase synchronization with a clock fed from the L system clock transmission line to the R system clock transmission line being currently not in use and causes its own receiver circuit 5 to make active clocks received from the R system clock transmission line and simultaneously has other devices know, by giving a notice of outputting of the clock from the R system clock transmission line, that the clock received from the R system clock transmission line has been made active, thereby rendering active the clock fed from the R system clock transmission line in all devices. During this period of time, all the devices are operated by clocks synthesized from clocks received from the L system clock transmission line and from the R system clock transmission line.

The device #2 sends out a notice of stopping the receipt of clocks from the L system clock transmission line to all devices and causes the receiver circuits 4 of other devices to stop receiving clocks from the L system clock transmission line. After the source of clocks of its own PLO circuit 2 is switched to network clocks, the device #2 stops receiving clocks from the L system clock transmission line.

After the device #1 is given a request for stopping the output of clocks received from the L system clock transmission line and also a notice that the clock master has been opened, and after the output of clocks received from the L system clock transmission line by the driver circuit 3 of the device #1 is stopped and the device #1 is made separable from the system, the multimedia multiplexing device #2 acts as a clock master thereafter.

Furthermore, the above detailed description of operations of the PLO circuit has pointed that, if the multimedia multiplexing device is operated in phase synchronization with the network clock, a clock being in phase with a reference input is regenerated, while, if operated in phase synchronization with a clock fed from the extension bus, a clock leading the reference input in phase is regenerated. The reason is that, because a clock generated by the clock master device is received through a connection cable of the extension bus, a delayed operation caused by this signal transfer has to be cancelled, i.e., this operational principle allows a phase relation between a clock fed by the L system clock transmission line of the extension bus, as shown in FIG. 6, and a clock fed by the R system clock transmission line to be well maintained, thus enabling a correct synthesis in the AND circuit of the receiver circuit.

Additionally, in this embodiment, there is provided a block diagram wherein the clock signal among devices is divided into the 2f0 clock and f0 clock and each of them is transmitted separately. However, this is not the essentials of the present invention, i.e., the f0 clock only or a clock obtained in advance by ORing the 2f0 clock with the f0 clock, as shown by a wavy line in the receiver circuit in FIG. 5, may be transmitted.

Figure 8:
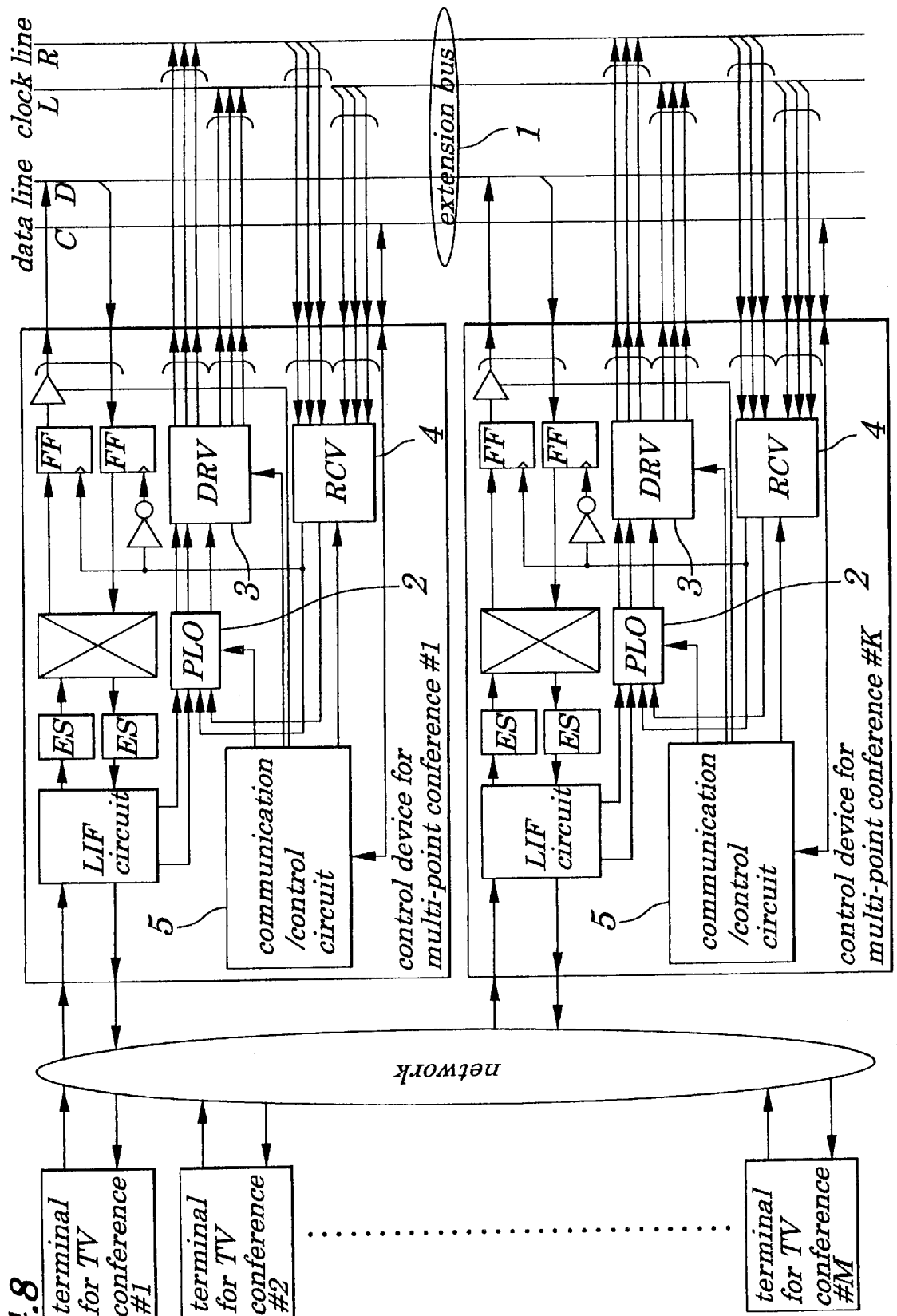
FIG. 8 is a block diagram showing a system according to another embodiment of the present invention.
Figure 9:
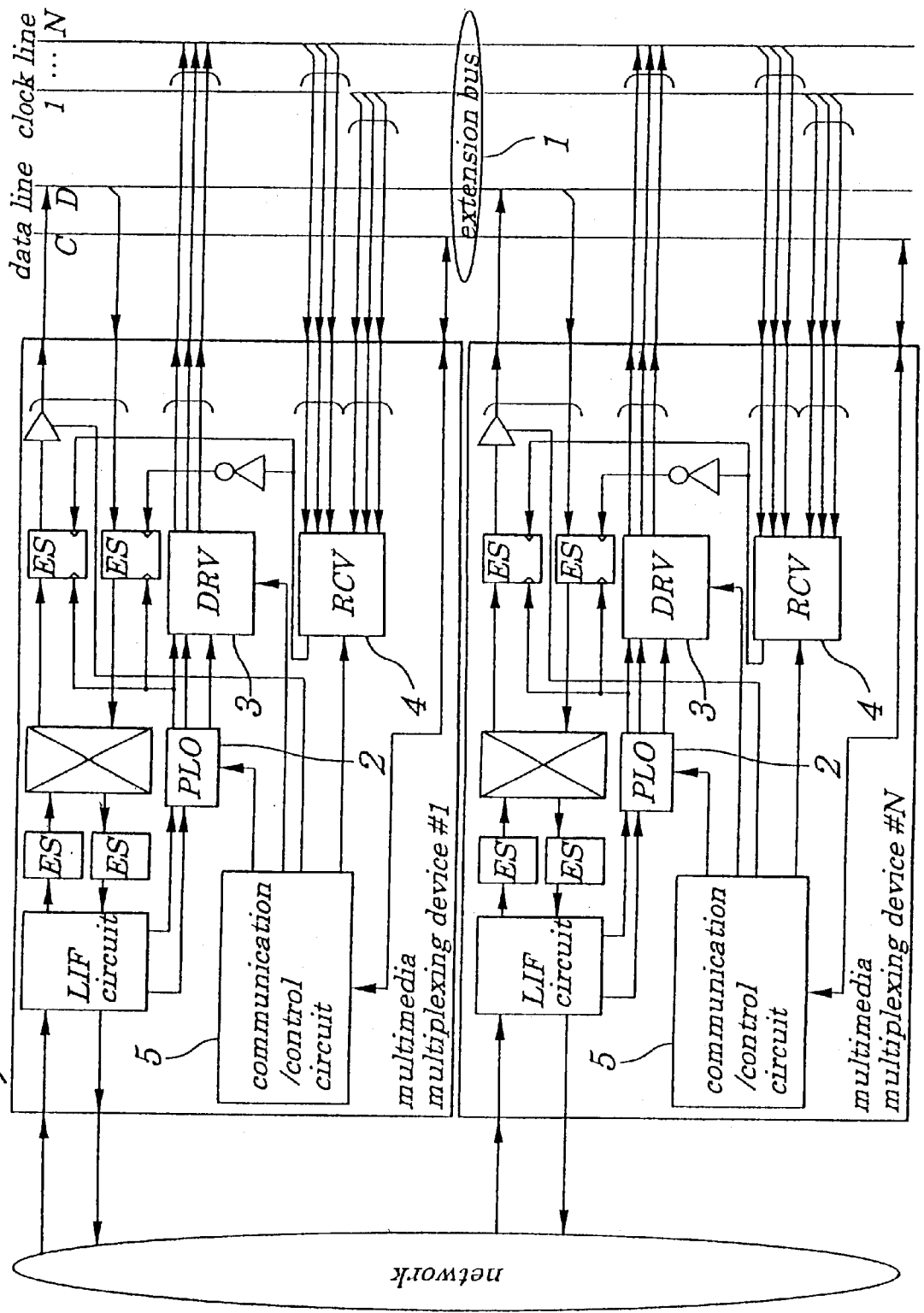
FIG. 9 is a block diagram showing a conventional system.

The present invention can be applied to a system where the multimedia multiplexing device shown in FIG. 1 is replaced by a multi-point control device #K to realize a TV conference among multi-points. Its configuration is given in FIG. 8.

As shown in the drawing, both a plurality of terminals #M for TV conference and a plurality of independently-operable multi-point control devices #M are connected to the same network in parallel. By independently operating each multi-point control device #K and by using terminals #M for the TV conference within the range of numbers in which each multi-point control device #K at multi-points can contain, a plurality of TV conferences among multi-points is made possible. A large-scale TV conferences at multi-points by using more numbers of terminals #M for the TV conference are also made possible by extending capabilities, i.e., by connecting two or more multi-point control devices #K through a bus.

As described above, according to the present invention, in order to implement the extension bus system, because not a system wherein a clock generated by plural devices operating in phase synchronization with a network clock is selected for switching but a system wherein other devices operate in phase synchronization with one device operating in phase synchronization with the network clock is employed, it is not necessary to have elastic memory installed to implement non-break switching and it is possible to downsize the hardware and to increase operational reliability and to reduce the cost accordingly. Moreover, a device that had not yet been connected to the line or that has been booted later can start servicing immediately after the connection to the line.

Furthermore, two systems of a clock transmission line are provided for one system of a data transmission line and one system of the clock transmission line is normally used. When a clock is to be switched, since the device is temporarily operated by a clock synthesized from clocks fed by both systems, service can be supplied without instantaneous chopping of data.

Additionally, in the PLO circuit, delays in connection cables among devices are compensated, ensuring a stable operation.

It is thus apparent that the present invention is not limited to the above embodiments but may be changed and modified without departing from the scope and spirit of the invention.

Finally, the present application claims the priorities of Japanese Patent Application Nos. Hei10-218073 and Hei10-218774 filed on Jul. 31, 1998 and Aug. 3, 1998 respectively, which are herein incorporated by references.

What is claimed is:

1. A method of network synchronization for an extended system having a plurality of multiplexing devices connected to the same network in parallel through an extension bus, said method comprising the steps of:

using one of said two or more multiplexing devices as a clock master and other remaining multiplexing devices as slave devices wherein said multiplexing device acting as the clock master establishes synchronization with a clock received from said network, while said multiplexing devices acting as the slave devices establish synchronization with said network by receiving a clock outputted after said clock master has established synchronization with said network, from a clock transmission line of said extension bus, and by regenerating a clock leading said received clock in phase.

2. The method of network synchronization according to claim 1, applied to a system where said multimedia multiplexing device is replaced by a multi-point control device to realize a TV conference among multi-points;

Wherein both a plurality of terminals for TV conference and a plurality of said multi-point control devices independently-operable are connected to the same network in parallel.

3. A method of network synchronization among two or more multiplexing devices constituting an extended system connected to the same network in parallel through an extension bus, said method comprising the steps of:

using one of said two or more multiplexing devices as a clock master and other remaining multiplexing devices as slave devices wherein said multiplexing device acting as the clock master establishes synchronization with a clock received from said network, while said multiplexing devices acting as slave devices establish synchronization with other multiplexing devices by receiving a clock outputted after said clock master has established synchronization with said network, from a clock transmission line of said extension bus, and by regenerating a clock leading said received clock in phase.

4. The method of network synchronization according to claim 3, applied to a system where said multimedia multiplexing device is replaced by a multi-point control device to realize a TV conference among multi-points;

Wherein both a plurality of terminals for TV conference and a plurality of said multi-point control devices independently-operable are connected to the same network in parallel.

5. A method of network synchronization for an extended system having a plurality of multiplexing devices connected to the same network in parallel through an extension bus, said method comprising the steps of:

using one of said two or more multiplexing devices as a clock master and other remaining multiplexing devices as slave devices. wherein said multiplexing device acting as the clock master establishes synchronization with a clock received from said network, while said multiplexing devices acting as slave devices establish synchronization with said network and said multiplexing devices by receiving a clock outputted after said clock master has established synchronization with said network, from a clock transmission line of said extension bus, and by regenerating a clock leading said received clock in phase.

6. The method of network synchronization according to claim 5, applied to a system where said multimedia multiplexing device is replaced by a multi-point control device to realize a TV conference among multi-points;

Wherein both a plurality of terminals for TV conference and a plurality of said multi-point control devices independently-operable are connected to the same network in parallel.

7. A method for switching a clock master in an extended system having a plurality of multiplexing devices connected to the same network in parallel through an extension bus, said method comprising the steps of:

providing said extension bus with clock transmission lines consisting of an active system and a standby system, and with data transmission lines;

establishing synchronization of a clock between all multiplexing devices and said network, and among said multiplexing devices by slave devices' receiving, through said extension bus, a clock with which a clock master is in phase synchronization with a network clock and by regenerating a clock based on the received clock, wherein each of said multiplexing devices comprises a clock regenerating circuit to regenerate a clock leading the received clock in phase based on the clock received from said network if each of said multiplexing device is used as a clock master or based on a clock received from the extension bus if used as slave devices, an output circuit to output a clock regenerated when each of said multiplexing device is used as the clock master and timing signal to an active clock transmission line of said extension bus, a control circuit to monitor the slave state of each device and a fault, and a receiving circuit to output a clock fed from either of said clock lines in response to a control signal fed by said control circuit or to output a clock synthesized clocks from two systems obtained by ANDing clocks fed from the active and standby clock transmission lines; and using one of multiplexing devices to which a role of a clock master is transferred to be a new clock master, wherein, if said control circuit detects that a fault has occurred in the clock master, one of said multiplexing devices to which a role of a clock master is transferred is selected by each control circuit of each multiplexing device, and any of said multiplexing devices decided to be a new clock master outputs regenerated clock to said standby clock transmission line, while other slave devices, using their receiving circuits, temporarily make active clocks from both clock transmission lines, synthesize clocks fed by two systems obtained by ANDing clocks from the active and standby clock transmission lines for outputting, regenerate a clock using the logically synthesized clock, and then stop outputting of a clock to the clock transmission line of the clock master having a fault.

* * * * *